United States Patent
Boczek

(10) Patent No.: US 9,108,274 B2
(45) Date of Patent: Aug. 18, 2015

(54) METHOD FOR THE PRODUCTION OF A PISTON

(75) Inventor: Sascha-Oliver Boczek, Dielheim (DE)

(73) Assignee: Mahle International GmbH (DE)

( * ) Notice: Subject to any disclaimer, the term of this patent is extended or adjusted under 35 U.S.C. 154(b) by 915 days.

(21) Appl. No.: 13/243,143

(22) Filed: Sep. 23, 2011

(65) Prior Publication Data

US 2012/0279390 A1 Nov. 8, 2012

(30) Foreign Application Priority Data

May 5, 2011 (DE) .......................... 10 2011 075 300

(51) Int. Cl.
| | |
|---|---|
| F16J 1/09 | (2006.01) |
| B23K 37/04 | (2006.01) |
| B23P 15/10 | (2006.01) |
| F02F 3/00 | (2006.01) |
| F02F 3/22 | (2006.01) |
| B23K 37/053 | (2006.01) |
| B23K 20/12 | (2006.01) |

(52) U.S. Cl.
CPC ........... *B23K 37/0435* (2013.01); *B23K 20/129* (2013.01); *B23K 37/053* (2013.01); *B23P 15/10* (2013.01); *F02F 3/003* (2013.01); *F02F 3/22* (2013.01); *F02F 2003/0061* (2013.01)

(58) Field of Classification Search
CPC ............. B23K 37/0435; B23K 37/053; B23K 20/129; B23P 15/10; F02F 3/003; F02F 3/22; F02F 2003/0061

USPC ........................ 92/169.1, 186, 208, 231, 260; 29/888.045, 888.044, 888.042; 228/183, 212, 213, 112.1

See application file for complete search history.

(56) References Cited

U.S. PATENT DOCUMENTS

| | | | |
|---|---|---|---|
| 6,032,619 A | 3/2000 | Zhu et al. | |
| 2003/0037671 A1 * | 2/2003 | Zhu et al. | ........................ 92/231 |

FOREIGN PATENT DOCUMENTS

| | | |
|---|---|---|
| DE | 69917904 T3 | 5/2007 |
| DE | 102008034430 A1 | 5/2010 |
| EP | 1876344 B1 | 3/2011 |
| GB | 1096826 A | 12/1967 |
| JP | 56-124650 A | 9/1981 |

OTHER PUBLICATIONS

English abstract provided for DE-102008034430.
English abstract for EP-1876344.
English abstract for JP-56-124650.

* cited by examiner

*Primary Examiner* — Dwayne J White
*Assistant Examiner* — Logan Kraft
(74) *Attorney, Agent, or Firm* — Fishman Stewart Yamaguchi PLLC

(57) ABSTRACT

A piston may include a piston upper part and a piston lower part. The piston upper part may be welded via a contact surface with the piston lower part forming a cooling duct therebetween. The cooling duct may define an inlet opening and an outlet opening extending from the piston lower part in the cooling duct. A welding bead may be formed within the cooling duct at each of the inlet opening and the outlet opening.

20 Claims, 2 Drawing Sheets

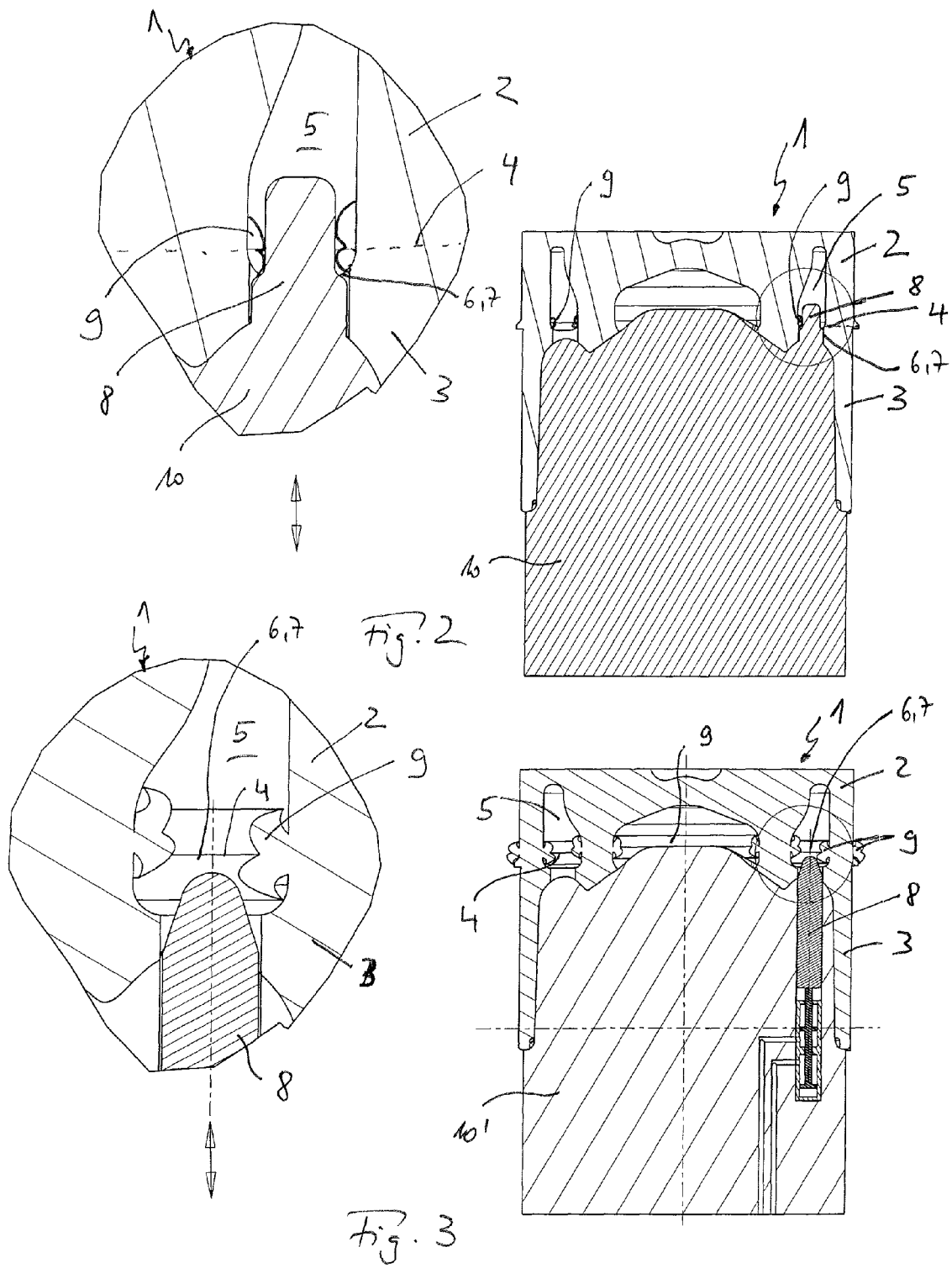

METHOD FOR THE PRODUCTION OF A
PISTON

CROSS-REFERENCES TO RELATED
APPLICATION

This application claims priority to German patent application DE 10 2011 075 300.1 filed on May 5, 2011, which is hereby incorporated by reference in its entirety.

TECHNICAL FIELD

The present invention relates to a method for the production of a piston composed of a piston upper part and a piston lower part, in accordance with the introductory clause of claim 1. In addition, the invention relates to a piston produced according to such a method and a clamping/welding device to carry out the method according to the invention.

BACKGROUND

From DE 10 2008 034 430 A1 a generic method is known for the production of a piston composed of a piston upper part and a piston lower part of an internal combustion engine, in which the piston upper part is welded via a contact surface with the piston lower part and thereby a cooling duct is formed which is situated therebetween. To introduce a coolant into the cooling duct, a flow tube which is inserted into the piston lower part and projects from a cooling channel base is arranged in an inlet opening, the opening of which flow tube is arranged above welding beads of the friction-welded connection. In this installation position, the flow tube is fixed in position in the region of the contact geometry on both sides partially by the welding beads which occur during the friction-welded connection. The flow tube which is inserted remains in the piston after the production of the friction-welded connection and ensures an unrestricted cross-section in the region of the inlet opening.

A disadvantage from the prior art is that to keep the inlet opening free, firstly the flow tube which is able to be inserted into the piston lower part must be mounted and adjusted, resulting in assembly costs which are not to be underestimated. At the same time, the flow tube, which of course can also be positioned in the same way in an outlet opening of the cooling duct, requires storage and logistics expenses which are not to be underestimated.

SUMMARY

The present invention therefore deals with the problem of providing an improved or at least an alternative embodiment for a method of the generic type, which in particular makes possible a simpler and more favourably priced production of a piston composed of a piston upper part and a piston lower part.

This problem is solved according to the invention by the subject matter of the independent claims. Advantageous embodiments are the subject matter of the dependent claims.

The present invention is based on the general idea, for keeping free an inlet opening and/or an outlet opening of a cooling duct of a piston, delimited by a piston lower part and a piston upper part, not as known from the prior art of providing a flow tube remaining in the piston, but rather a pin, which during or immediately after the welding of the piston upper part with the piston lower part is held out from the latter in the cooling duct or is pushed therein, and after completion of the welding process is withdrawn therefrom again, so that a welding bead occurring during the welding process does not constrict a cross-section of the inlet opening and/or of the outlet opening. The pin is either connected securely here according to the invention with a clamping jaw holding the piston lower part, or is mounted adjustably thereon, so that after completion of the welding process the pin is in all cases withdrawn from the inlet opening or respectively from the outlet opening again and thereby exclusively the opening itself remains in the piston. The piston is composed here in a known manner from a piston lower part and a piston upper part, wherein the piston upper part is welded with the piston lower part via a contact surface, in particular is friction-welded, and thereby a cooling channel can be formed which is delimited therebetween. By the method according to the invention, in particular the necessary mounting of a flow tube in the piston lower part before the actual welding process can be dispensed with, whereby the assembly costs can be reduced and thereby the piston can be produced at a more favourable cost. By the omission of the flow tube which was necessary hitherto, the costs for this are also dispensed with, in particular the production, storage and logistics costs, which likewise reduces the price of the piston according to the invention, compared with pistons known from the prior art.

In an advantageous further development of the solution according to the invention, the at least one pin is securely connected with a first clamping jaw, holding the piston lower part during the welding process, and can be moved exclusively together therewith. In this special embodiment, the piston lower part is clamped in the first clamping jaw, wherein the at least one pin already projects through the inlet opening and/or outlet opening into the cooling duct. The projecting of the at least one pin into the cooling duct extends here at least up to the height of the welding beads which occur in the friction-welded connection. The piston upper part is now clamped in the second clamping jaw, wherein the first and the second clamping jaws are part of a clamping/welding device. The actual friction-welding process now begins, in which the two clamping jaws are pressed against each other and rotated. The welding beads, spreading out inwardly here into the cooling duct, are braked by the at least one pin in their further spreading process and, owing to the geometry of the at least one pin, are pressed against the walls of the cooling duct. After completion of the friction-welding process, the clamping/welding device opens, by the two clamping jaws moving apart, whereupon the welded piston can be removed. On removal of the piston, the pin which is connected securely with the first clamping jaw of the clamping device is drawn out here from the inlet opening and/or the outlet opening, without its cross-section reducing in the process.

In an alternative embodiment of the method according to the invention, the at least one pin is arranged adjustably on the first clamping jaw of the clamping/welding device and in addition is adjustable hydraulically, pneumatically or electrically and independently of the first clamping jaw. For this a, preferably hydraulic, adjustment device is provided on the first clamping jaw, for adjusting the at least one pin. The method begins again here such that the piston lower part is clamped into the first clamping jaw and the piston upper part is clamped into the associated second clamping jaw of the clamping/welding device. The friction-welding process now begins, in which the piston upper part is pressed via its contact surface against the piston lower part and in so doing is rotated. After the rotation stop, the respective friction-welded regions on the contact surface are still so hot that they are deformable, whereupon the at least one pin is moved out by means of the adjustment device and in so doing presses aside the welding beads in the region of the inlet opening and/or the outlet opening. Thereafter, the pin moves back into its initial position into the first clamping jaw, whereupon the clamping/welding device opens and the welded piston can be removed. In this embodiment also it can be guaranteed in a simple and favourably priced manner that a cross-section of the inlet/outlet opening is kept free.

In a further advantageous embodiment of the solution according to the invention, the at least one pin tapers towards its free end and thereby creates in particular a conical cross-section for keeping free. However, in so doing, the tapering pin not only creates a conical cross-section for keeping free, but also, owing to its shape, facilitates a removal of the piston lower part from the first clamping jaw or respectively a moving back of the pin by means of the adjustment device. Of course, other shapes of the pin are also conceivable. Furthermore, a special choice of material for the pin or a coating thereof is also conceivable, which in particular promote the pressing away of the welding beads and/or the drawing out of the pin.

Further important features and advantages of the invention will emerge from the subclaims, from the drawings and from the associated description of figures with the aid of the drawings.

It is to be understood that the features mentioned above and to be explained below are able to be used not only in the respectively indicated combination, but also in other combinations or in isolation, without departing from the scope of the present invention.

Preferred example embodiments of the invention are represented in the drawings and are explained in further detail in the following description, wherein identical reference numbers refer to identical or similar or functionally identical components.

BRIEF DESCRIPTION OF THE DRAWING

There are shown, diagrammatically respectively.

DETAILED DESCRIPTION

Figure 1:
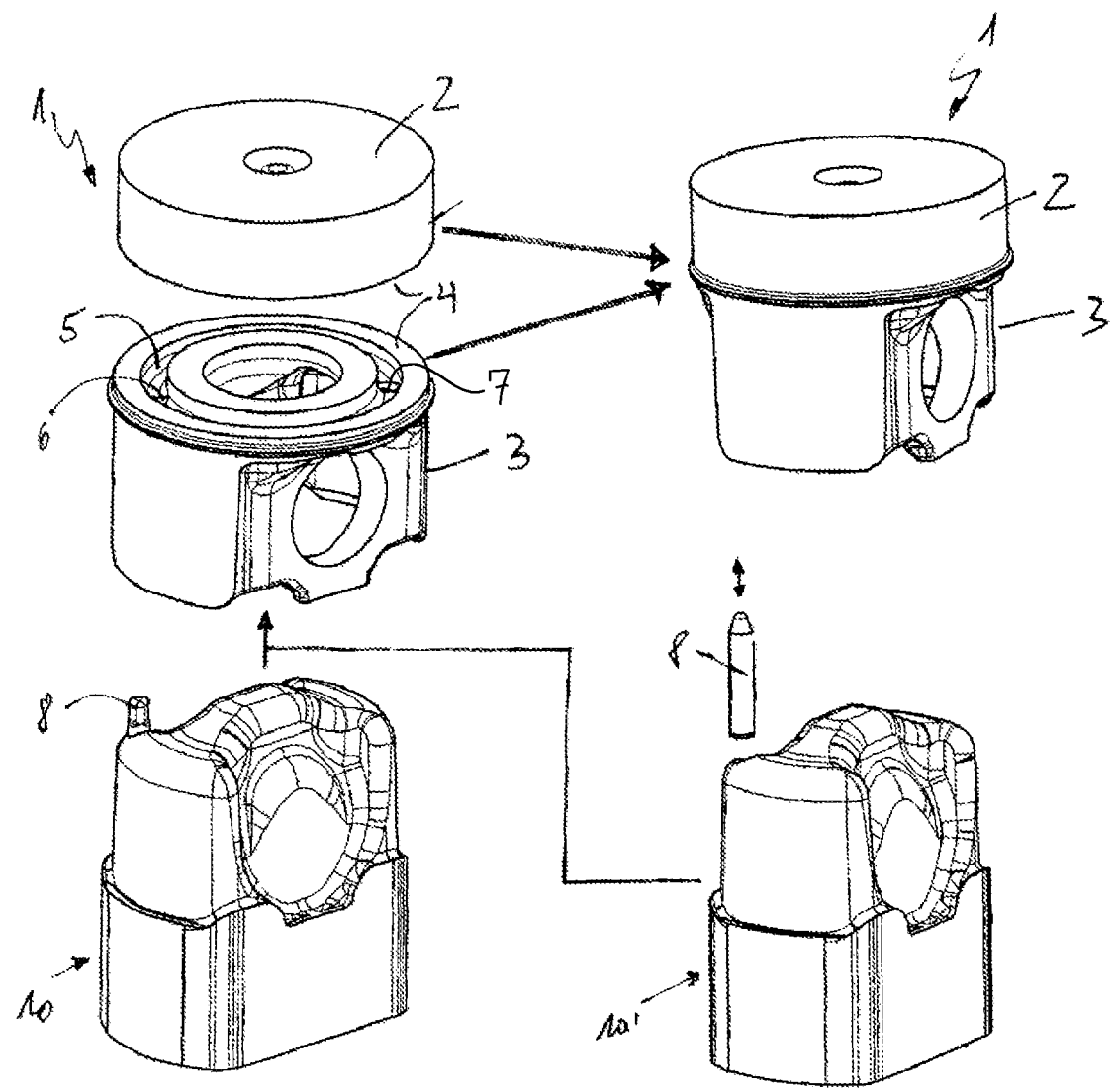
FIG. 1 a piston according to the invention, composed of a piston upper part and a piston lower part, with associated first clamping jaw of a clamping/welding device, FIG. 2 a sectional representation through a first embodiment of the first clamping jaw with piston fitted, FIG. 3 a representation as in FIG. 2, but in a different embodiment of the first clamping jaw.

In accordance with FIG. 1, a piston 1 according to the invention is composed of a piston upper part 2 and a piston lower part 3, which are welded together via a contact surface 4, in particular are connected with each other via a friction-welded connection. As can be seen here in particular also from FIGS. 2 and 3, through the piston upper part 2 and the piston lower part 3, a cooling duct 5, lying therebetween, is formed or respectively delimited. For the production or keeping free at least of one inlet opening 6 and/or outlet opening 7 of the cooling duct 5 during or immediately after the welding of the piston upper part 2 with the piston lower part 3, at least one pin 8 is held out from the piston lower part 3 in the cooling duct 5 or is inserted therein, and is drawn out again after the welding process, so that a welding bead 9, occurring during the welding process, does not restrict a cross-section of the inlet opening 6 and/or of the outlet opening 7, i.e. does not constrict it.

Basically, two different methods can be applied here, in which two different first clamping jaws 10, 10' are used, via which the piston lower part 3 is held during the production of the friction-welded connection. In the first variant of the clamping jaw 10, the pin 8 is securely connected with the first clamping jaw 10 and can therefore be connected exclusively together with the first clamping jaw 10 (cf. also FIG. 2). In the second variant of the first clamping jaw 10', the at least one pin 8 is adjustable hydraulically, pneumatically or electrically and can thereby be moved independently of the first clamping jaw 10' (cf. FIG. 3).

The first clamping jaw 10, 10' is part here of a clamping/welding device according to the invention, which is otherwise not shown, which additionally has a second clamping jaw for holding the piston upper part 2, wherein the two clamping jaws are able to be pressed against each other and in this state are able to be rotated with respect to each other for the production of the friction-welded connection.

The manufacturing of the piston 1 according to the invention takes place here in accordance with the first method variant as follows:

Firstly the piston lower part 3 is clamped in the first clamping jaw 10, whereas the piston upper part 2 is clamped in the second clamping jaw, not shown and lying opposite, of the clamping/welding device. On clamping of the piston lower part 3 onto the first clamping jaw 10, the pin 8, which is constructed integrally with the first clamping jaw 10, is already guided through the inlet opening or respectively outlet opening 6, 7. Subsequently, a moving onto each other takes place, and a rotating with respect to each other, exerted under pressure, of the two piston parts 2, 3, whereupon they the latter heat up greatly in their contact surface 4, such that a friction-welded connection is produced there. The welding beads 9 occurring during this are braked by the pin 8 in their spreading into the cooling duct 5 and in particular also into a cross-section of the inlet opening 6 or respectively of the outlet opening 7 and, owing to the geometry of the pin 8, are pressed against the walls of the cooling duct 5. After completion of the friction-welding process, the clamping/welding device according to the invention opens, by the two clamping jaws being pulled apart. During the subsequent drawing off of the piston lower part 3 from the first clamping jaw 10, the at least one pin 8 is drawn out from the inlet opening 6 or respectively from the outlet opening 7.

The manufacturing of the piston 1 according to the invention takes place here in accordance with the second method variant as follows:

Firstly, the piston lower part 3 is clamped on the first clamping jaw 10' and the piston upper part 2 is clamped on the second clamping jaw, which lies opposite and is not shown. Subsequently, the production of the friction-welded connection takes place on the contact surface 4 in the usual manner. After completion of the friction-welded connection, the friction-welded regions in the region of the contact surface are still so hot that they are deformable. At this moment, the hydraulically, pneumatically or electrically adjustable pin 8, having the geometry shown, moves out and pushes aside the welding beads 9, formed during the friction-welding process, at least in the region of the inlet opening 6 and/or of the outlet opening 7. Subsequently, the pin 8 is moved back into its initial position, whereupon the clamping/welding device opens and the piston lower part 3 can be removed from the first clamping jaw 10'.

Generally, the at least one pin 8 can taper here towards its free end, whereby in particular a pressing away of the welding beads 9 is facilitated with a movable pin 8, likewise a drawing out thereof at the end of the production process according to the invention. Of course, several pins 8 can be provided here on the first clamping jaw 10, 10', particularly when the piston lower part 3 has several inlet openings 6 and/or outlet openings 7. The most varied of materials, such as metal or ceramics, can be used here for the pin 8 itself.

With the method according to the invention, or respectively with the clamping/welding device according to the invention, in particular the cross-section of the at least one inlet opening 6 and/or of the at least one outlet opening 7 on the piston lower part 3 can be kept free, without separate flow tubes having to be kept available and installed for this. Hereby, the production process is not only simplified, but is also reduced in cost.

The invention claimed is:

1. A piston comprising:
a piston upper part and a piston lower part, wherein the piston upper part is welded via a contact surface with the piston lower part forming a cooling duct therebetween, the cooling duct defining an inlet opening and an outlet opening, wherein at least one of the inlet opening and the outlet opening is configured to receive at least one pin, wherein the cooling duct is configured to accommodate the at least one pin via the at least one pin being at least one of extended from the piston lower part in the cooling duct and pushed into the cooling duct, and a welding bead disposed within the cooling duct at at least one of the inlet opening and the outlet opening, wherein the welding bead is pressed against the walls of the cooling duct via the at least one pin.

2. The piston according to claim 1, wherein the piston lower part is configured to receive a first clamping jaw during a welding process, the first clamping jaw securely connected with the at least one pin.

3. The piston according to claim 2, wherein the piston upper part is connected with the piston lower part via a friction-welded connection.

4. The piston according to claim 1, wherein the piston lower part is configured to receive a clamping jaw having the at least one pin, the at least one pin being adjustable by at least one of hydraulically, pneumatically and electrically, and is movable independently of a clamping jaw.

5. The piston according to claim 4, wherein the piston upper part is connected with the piston lower part via a friction-welded connection.

6. The piston according to claim 1, wherein the piston upper part is connected with the piston lower part via a friction-welded connection.

7. The piston according to claim 1, wherein the welding bead does not constrict a cross section of at least one of the inlet opening and the outlet opening.

8. The piston according to claim 1, wherein the welding bead is pressed against the walls of the cooling duct in a region corresponding to at least one of the inlet opening and the outlet opening configured to receive the at least one pin.

9. The piston according to claim 1, wherein the welding bead is pressed against the walls of the cooling duct in a region corresponding to at least one of the inlet opening and the outlet opening configured to receive the at least one pin as compared to the welding bead in a region spaced away from at least one of the inlet opening and the outlet opening configured to receive the at least one pin.

10. A piston, comprising:
a piston upper part and a piston lower part, wherein the piston upper part is welded via a contact surface with the piston lower part;
a cooling duct defined between the piston upper part and the piston lower part, the cooling duct defining an inlet opening and an outlet opening, wherein at least one of the inlet opening and the outlet opening is configured to receive at least one pin, wherein the cooling duct is configured to accommodate the at least one pin via the at least one pin being at least one of extended from the piston lower part in the cooling duct and pushed into the cooling duct; and
a welding bead disposed within the cooling duct at at least one of the inlet opening and the outlet opening, wherein the welding bead is deformed against the walls of the cooling duct in a region corresponding to at least one of the inlet opening and the outlet opening configured to receive the at least one pin.

11. The piston according to claim 10, wherein the piston lower part is configured to receive a first clamping jaw during a welding process, the first clamping jaw securely connected with the at least one pin.

12. The piston according to claim 11, wherein the piston upper part is connected with the piston lower part via a friction-welded connection.

13. The piston according to claim 10, wherein the piston lower part is configured to receive a clamping jaw having the at least one pin, the at least one pin being adjustable by at least one of hydraulically, pneumatically and electrically, and is movable independently of a clamping jaw.

14. The piston according to claim 10, wherein the piston upper part is connected with the piston lower part via a friction-welded connection.

15. The piston according to claim 10, wherein the welding bead does not constrict a cross section of at least one of the inlet opening and the outlet opening.

16. A piston, comprising:
a piston upper part and a piston lower part, wherein the piston upper part is welded via a contact surface with the piston lower part;
a cooling duct defined between the piston upper part and the piston lower part, the cooling duct defining an inlet opening and an outlet opening, wherein at least one of the inlet opening and the outlet opening is configured to receive at least one pin, wherein the cooling duct is configured to accommodate the at least one pin via the at least one pin being at least one of extended from the piston lower part in the cooling duct and pushed into the cooling duct; and
a welding bead disposed within the cooling duct at at least one of the inlet opening and the outlet opening, wherein the welding bead is pressed against the walls of the cooling duct in a region corresponding to at least one of the inlet opening and the outlet opening configured to receive the at least one pin as compared to a welding bead in a region spaced away from at least one of the inlet opening and the outlet opening configured to receive the at least one pin.

17. The piston according to claim 16, wherein the piston lower part is configured to receive a first clamping jaw during a welding process, the first clamping jaw securely connected with the at least one pin.

18. The piston according to claim 16, wherein the piston lower part is configured to receive a clamping jaw having the at least one pin, the at least one pin being adjustable by at least one of hydraulically, pneumatically and electrically, and is movable independently of a clamping jaw.

19. The piston according to claim 16, wherein the piston upper part is connected with the piston lower part via a friction-welded connection.

20. The piston according to claim 16, wherein the welding bead does not constrict a cross section of at least one of the inlet opening and the outlet opening.

* * * * *